United States Patent [19]

Farn et al.

[11] Patent Number: 5,682,265
[45] Date of Patent: Oct. 28, 1997

[54] DIFFRACTIVE MICROSTRUCTURES FOR COLOR SEPARATION AND FUSING

[75] Inventors: Michael W. Farn, Burlington; Wilfrid B. Veldkamp, Lexington, both of Mass.

[73] Assignee: Massachusetts Institute of Technology, Cambridge, Mass.

[21] Appl. No.: 198,883

[22] Filed: Feb. 18, 1994

[51] Int. Cl.[6] .................................................. G02B 5/18
[52] U.S. Cl. .................. 359/571; 359/569; 359/615; 349/61; 345/88
[58] Field of Search .......................... 359/48, 558, 566, 359/569, 571, 615; 345/88, 151; 348/760, 761, 790, 791; 349/61

[56] References Cited

U.S. PATENT DOCUMENTS

| | | | |
|---|---|---|---|
| 4,255,019 | 3/1981 | Knop | 359/569 |
| 4,277,138 | 7/1981 | Dammann | 359/569 |
| 4,686,519 | 8/1987 | Yoshida et al. | 345/88 |
| 4,748,614 | 5/1988 | Dammann et al. | 359/130 |
| 4,798,448 | 1/1989 | van Raalte | 349/62 |
| 4,807,978 | 2/1989 | Grinberg et al. | 359/20 |
| 4,882,619 | 11/1989 | Hasegawa et al. | 358/55 |
| 4,895,790 | 1/1990 | Swanson et al. | 430/321 |
| 5,161,042 | 11/1992 | Hamada | 349/62 |
| 5,264,880 | 11/1993 | Sprague et al. | 353/31 |
| 5,497,269 | 3/1996 | Gal | 359/615 |

FOREIGN PATENT DOCUMENTS

| | | | |
|---|---|---|---|
| 0 583 150 A1 | 2/1994 | European Pat. Off. . | |
| 27422596 | 4/1979 | Germany | 359/569 |
| 0293222 | 12/1987 | Japan | 359/566 |
| 0293223 | 12/1987 | Japan | 359/566 |
| 0296213 | 12/1990 | Japan | 359/48 |
| 4-367817 | 12/1992 | Japan | 359/566 |

OTHER PUBLICATIONS

H. Dammann, "color Separation Gratings", Applied Optics, vol. 17, No. 15, 1 Aug. 1978, pp. 2273–2279.

G. J. Swanson, "Binary Optics Technology: The Theory and Design of Multi–Level Diffractive Optical Elements", MIT Technical Report 854, 14 Aug. 1989, pp. 1–24.

Michael Farn et al., Conference on Binary Optics, "Color Separation Gratings", NASA Conference Publication 3227, 409–421, 1993.

Michael Farn et al., Conference on Binary Optics, "Theory of Dispersive Microlenses", NASA Conference Publication 3227, 395–408, 1993.

Michael Farn et al., "Color Separation by Use of Binary Optics", Optics Letters, vol. 18, No. 15, Aug. 1, 1993.

"Improved Liquid Crystal Display panel illumination", IBM Technical Disclosure Bulletin, vol. 36, No. 09B (Sep., 1993).

*Primary Examiner*—Paul M. Dzierzynski
*Assistant Examiner*—John Juba, Jr.
*Attorney, Agent, or Firm*—Choate, Hall & Stewart

[57] ABSTRACT

Optical apparatus for dispersing a visible light spectrum into primary color bands and directing each color band into a specific pixelated cell of a passive display. The apparatus includes an array of refractive microlenses arranged parallel to the plane of the passive display such as a liquid crystal display and a diffraction grating arranged parallel and in close proximity to the lens array. The microlenses focus visible light onto the display while the diffraction grating separates the visible light into primary color bands in different diffraction orders such that the colors are directed to and transmitted through the corresponding specific pixelated cells.

4 Claims, 6 Drawing Sheets

DIFFRACTIVE MICROSTRUCTURES FOR COLOR SEPARATION AND FUSING

This invention was made with government support under Contract Number F19628-90-C-002 awarded by the Air Force. The government has certain rights in the invention.

BACKGROUND OF THE INVENTION

This invention relates to an optical apparatus and a method for separating visible light into its primary colors and directing each color into a corresponding pixelated cell of a passive display.

Today, there is a growing demand for more energy efficient color display devices for applications such as small portable televisions and notebook computers. The traditional cathode ray tube technology is unsuitable for these display device applications as these applications have restrictions in size, weight and energy efficiency, yet still require bright display of colors. To accommodate these restrictions, research and development efforts have been focused on passive display devices such as liquid crystal displays. In liquid crystal color displays, back illumination is frequently used as the light source; therefore, an important step in improving the liquid crystal display technology is to find a way to efficiently separate and image the back light into bright colors.

There are two common methods for achieving color images. One method uses a small filter of a particular color placed in front of each liquid crystal cell such that only light corresponding to one of the three primary colors is transmitted. Thus, each pixel contains three cells that each transmits red, green or blue. This method is inefficient because two thirds of the source light is lost in passing through each filter. The other method for color imaging employs dichroic beam splitters which rely on three separate displays as the splitters direct each color to one of the displays and three color displays are then re-combined. This method has a disadvantage of resulting in a noncompact display device.

U.S. Pat. No. 4,277,138 discloses an optical device for creating spatially separate images of an object to be imaged. Each of the spatially separate images includes a specific spectral region, such as red, green and blue. This patent utilizes a single lens for establishing the three separate images.

An alternative to these common methods is to use a diffraction grating with a lens array such that the light is split into its primary colors and directed into pixelated cells of the display. Although this concept has been suggested in the past by van Raalte in U.S. Pat. No. 4,798,448, the design and the fabrication of the diffraction grating and lens array was not disclosed as it is difficult to fabricate a diffraction grating or lens array appropriate to separate a visible light spectrum.

SUMMARY OF THE INVENTION

The present invention provides an apparatus and a method for dispersing a visible light spectrum into primary color bands and directing each color band into a corresponding pixelated cell of a passive display screen. The invention includes a diffraction grating and an array of refractive microlenses such that the diffraction grating separates the visible light into its primary color bands and the microlenses focus the separated bands into corresponding cells. In one aspect of the invention, the diffraction grating has an echelle structure which separates color bands into different diffraction orders. In another aspect of the invention, the diffraction grating has a blazed structure such that all color bands are diffracted into one order but the dispersion of the grating separates the bands within that order. In another embodiment the grating is a linear grating utilizing the +2, 0, and −3 orders. The diffraction grating may separate the light in one or two dimensions.

DESCRIPTION OF THE PREFERRED EMBODIMENT

Before presenting the specifics of the present invention, the theory behind diffraction gratings for separation of a light spectrum will be discussed.

Figure 1:
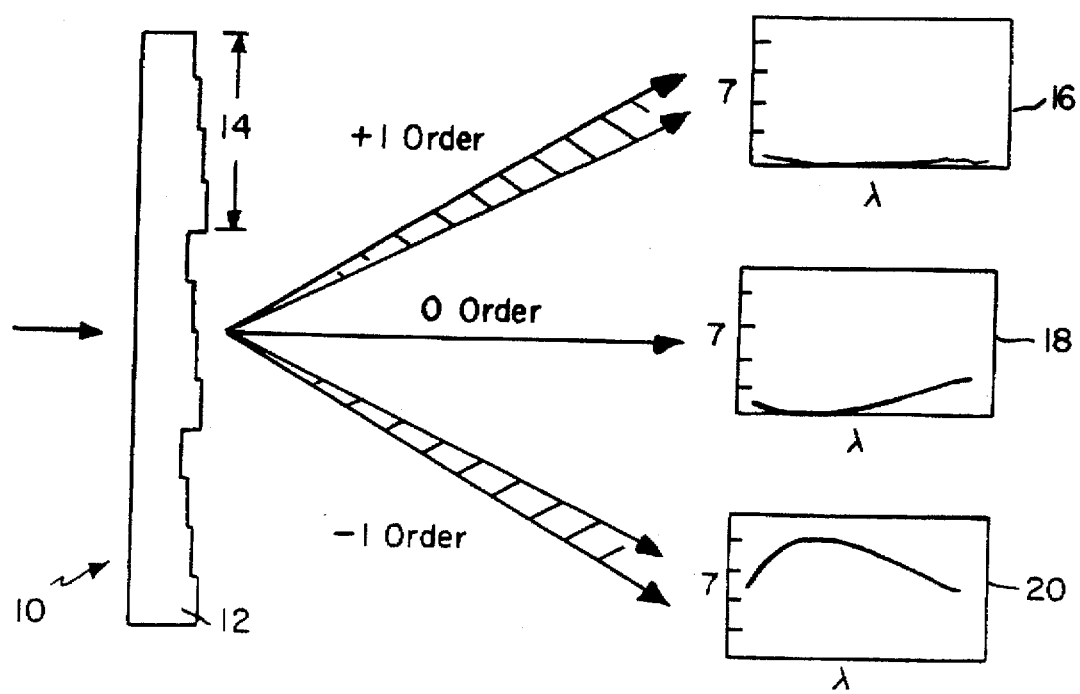
FIG. 1 is a profile view of a blazed grating and its diffraction efficiency curves for the +1 order, the 0 order and the −1 order.

A linear grating 10 may be approximated by a staircase profile as shown in FIG. 1. Each step 12 has a physical depth of $$d = \frac{\lambda_0}{[N(n_0 - 1)]}, \quad (1)$$

where N is the number of steps per grating period 14 and $n_0$ is the index of refraction of the material at the design wavelength $\lambda_0$. Each step introduces a $2\pi/N$ phase shift for a total phase shift of $2\pi$ across one grating period 14. The diffraction efficiency curves ($\lambda$ vs $\eta$) for the 0 order 18, the +1 order 16 and the −1 order 20 in FIG. 1 show that at $\lambda_0$, the grating is blazed for the −1 order. The diffraction efficiency for an i th order of an N-step linear grating is $$\eta(i,\lambda) = \text{sinc}^2\left(\frac{i}{N}\right) \text{sinm}^2\left[\frac{\lambda_0}{N\lambda} + \frac{i}{N}, N\right], \quad (2)$$

where $$\text{sinc}(x) = \frac{\sin(\pi x)}{\pi x}$$

and $$\text{sinm}(x,N) = \frac{\sin(N\pi x)}{N\sin(\pi x)}.$$

Figure 2:
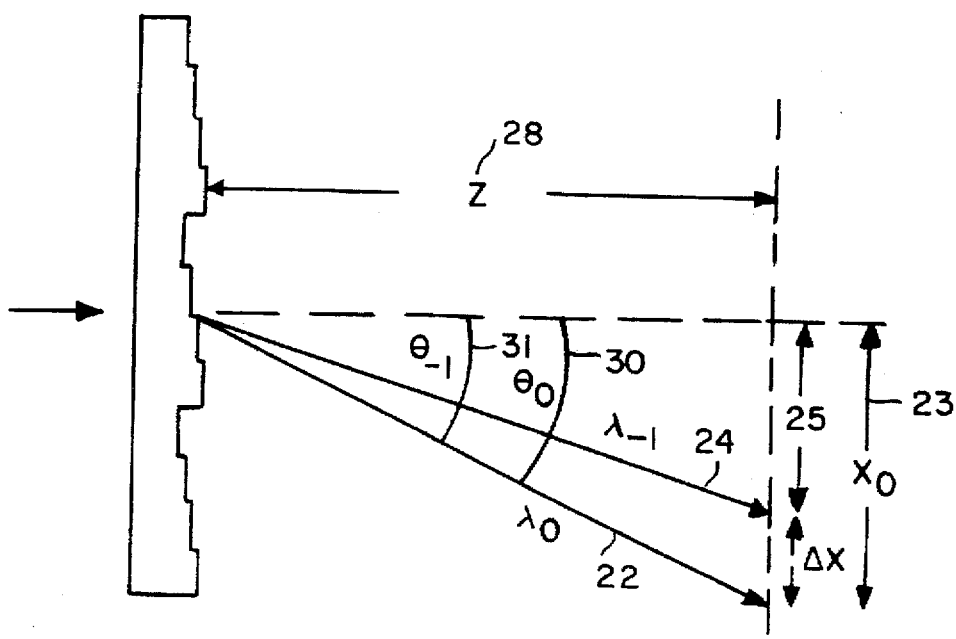
FIG. 2 is a profile view of a blazed grating illustrating separation angles and horizontal offsets for light passing through the grating.

In a linear grating, all wavelengths are diffracted primarily into one order. However, the dispersion of the grating separates the wavelengths 22, 24 within that order as illustrated in FIG. 2. Light of wavelength $\lambda$ is diffracted at an angle $$\sin\theta = \frac{i\lambda}{T} \quad (3)$$

where i is the diffraction order, $\lambda$ is the wavelength and T is the grating period 14. Therefore, a linear grating laterally offsets all wavelengths including the design wavelength 22 by $$x = \tan\theta z, \quad (4)$$

where z is the distance to the plane of interest 28 and $\theta$ is the angle of diffraction 30, 31. The design wavelength $\lambda_0$ is offset by amount $x_0$ 23 and a shorter wavelength $\lambda_{-1}$ 24 is offset by amount $x_0 - \Delta x$ 25.

Figure 3:
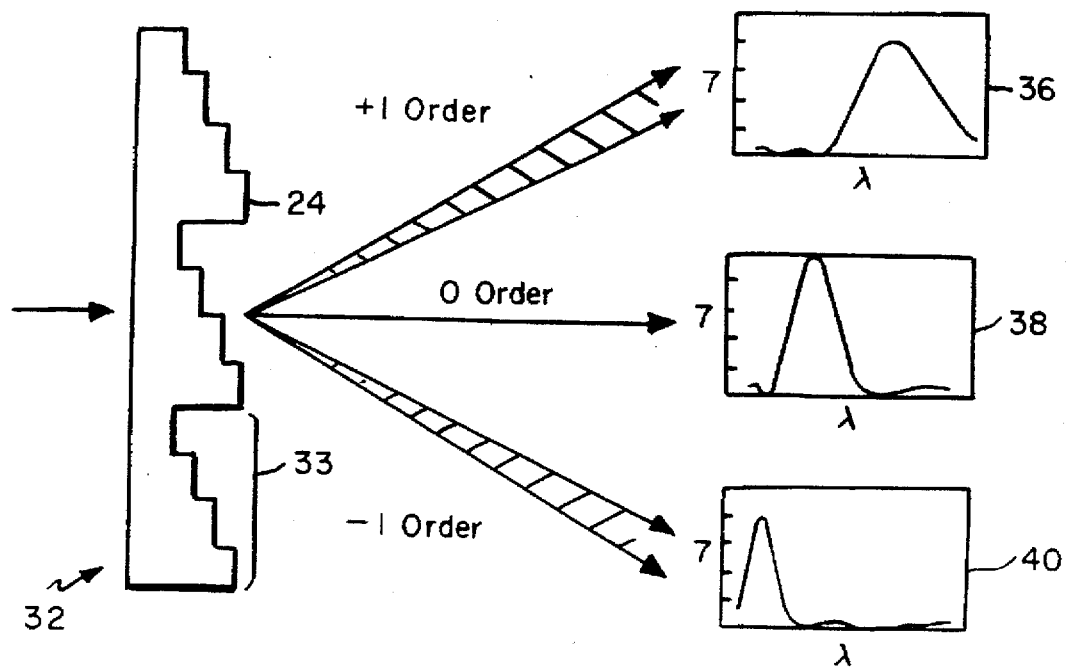
FIG. 3 is a profile view of an echelle grating and its diffraction efficiency curves for the +1 order, the 0 order and the −1 order.
Figure 4:
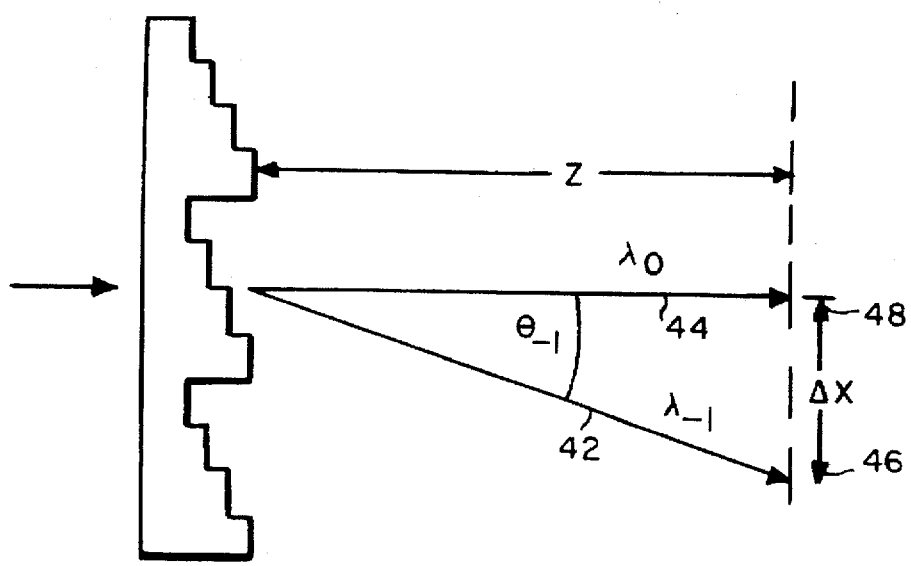
FIG. 4 is a profile view of an echelle grating illustrating separation angles and horizontal offsets for light passing through the grating.

An echelle grating 32 is shown in FIG. 3. This element also consists of N steps 33 per period, but each step 24 has a physical depth of $$d = \frac{\lambda_0}{(n_0 - 1)}, \quad (5)$$

such that each step is N times deeper than a linear grating step. Each echelle step introduces a phase shift of $2\pi$ at the design wavelength of $\lambda_0$. As shown in the diffraction efficiency graphs for the 0 order 38, the +1 order 36 and the −1 order 40 in FIG. 3, at $\lambda_0$, the structure 32 behaves like a flat plate and is most efficient in the 0 order 38. However, at the wavelength $\lambda_{-1}$, which is equal to $\lambda_0 N/(N+1)$ each step introduces a phase shift of $2\pi\lambda_0/\lambda_{-1}$ which is equivalent to $2\pi/N$. Therefore, it is effectively blazed for the −1 order 40. Likewise, $\lambda_{+1}$ is effectively blazed for the +1 order 36. The diffraction efficiency peak of an i th order occurs at the wavelength $$\lambda = \frac{N\lambda_0}{mN - i}, \quad (6)$$

where m is an integer, N is the number of steps per profile and $\lambda_0$ is the design wavelength. The diffraction angle of each diffraction order 42, 44 and the lateral offset 46, 48 shown in FIG. 4 can be calculated from equations 3 and 4. The design wavelength 44 in the echelle structure is always undiffracted, thus it is never laterally offset; while the shorter wavelength $\lambda_{-1}$ 42 is offset by amount $\Delta X$.

Figure 5:
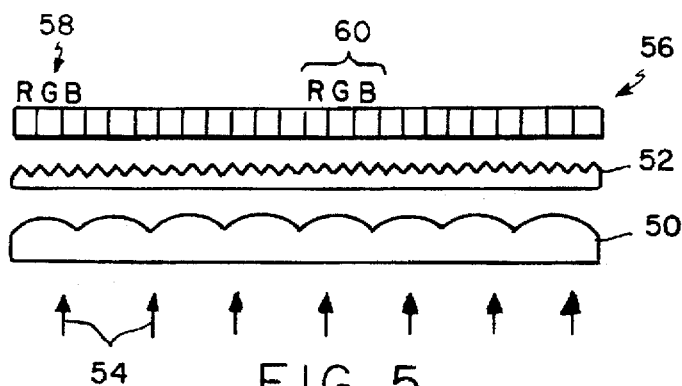
FIG. 5 is a schematic diagram of a passive display device with an array of microlenses and a diffraction grating according to the present invention.

The present invention is schematically illustrated in FIG. 5. This embodiment includes an array of refractive microlenses 50 and a diffraction grating 52 arranged parallel and in close proximity to the plane of the lenses 50. This combined device is arranged between a light source 54 and the passive display 56, such that the microlenses focus the light coming from the source 54 onto the liquid crystal display and the diffraction grating separates the light into primary colors. The result is that each primary color is directed into a corresponding liquid crystal cell 58 within a pixel 60.

Figure 5A:
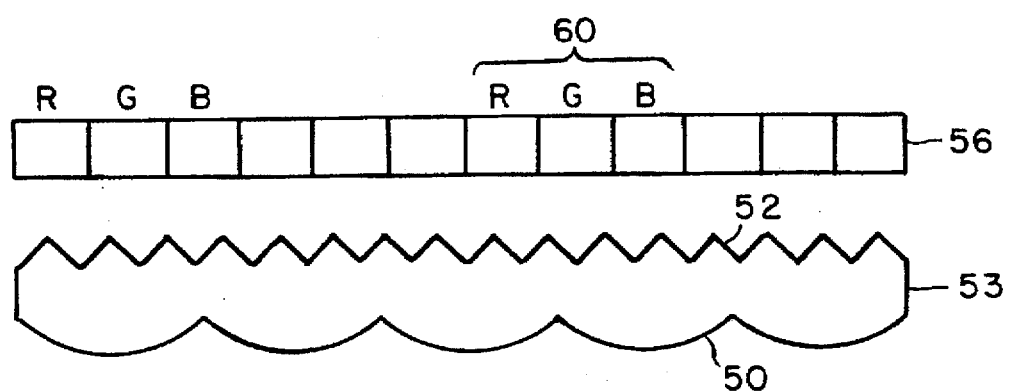
FIG. 5a is a schematic diagram of a passive display device with a unitary microlens array and diffraction grating.

FIG. 5a illustrates an embodiment in which a unitary structure 53 includes an array of microlenses 50 and diffraction grating 52.

In one embodiment, the diffraction grating 52 has an echelle structure as illustrated in FIG. 3. The echelle structure diffracts a light spectrum into its primary colors red, green and blue, such that green light is diffracted into the zero order, while red light and blue light are diffracted into the +1 and the −1 orders respectively. As the green light is undiffracted, it is not laterally offset. The red light and the blue light, on the other hand, are diffracted into opposite orders and therefore one is offset to one direction and the other is offset to the opposite direction. The refractive lenses 50 arranged near the grating 52 focus the light onto the display such that all the light would focus at the same location in a pixel, but the grating laterally offsets one color's focal point from another. The refractive lenses 50 and the grating 52 may be fabricated onto the same substrate, may be combined into one device or may be separate devices placed close to one another.

A 4-step echelle grating with a period of 16 µm has been fabricated for a design wavelength of 0.525 µm using binary optics technology. See, U.S. Pat. No. 4,895,790 for a discussion of this fabrication technology. The optical design of the echelle grating was transformed into a set of photomasks. To produce the final 16 µm period echelle, two Cr-photomasks with 50% duty cycle gratings of periods 8 µm and 16 µm were used. The pattern was then etched onto a substrate surface. A 2" diameter, 6 mm thick Suprasil fused silica disks with index of refraction of 1.46 was polished on both sides to a top surface flatness of $\lambda/10$ to serve as the substrate. The mask with the smaller features was printed and etched first in a Perkin Elmer sputter-etch system to a target depth of 1.14 µm. Afterwards, the second mask was printed and etched to a target depth of 2.28 µm. The depth of a single step was 1.14 µm and the total depth of the echelle was 3.42 µm.

Although this embodiment was fabricated with silica, it is to be understood that the invention may be fabricated with any material that is appropriate for use in the visible spectrum.

In another embodiment, the diffraction grating is a blazed grating as illustrated in FIG. 1. In a blazed grating, all of the visible spectrum is diffracted into one diffraction order, but dispersion caused by the grating separates the wavelengths within that order such that shorter wavelength light will be diffracted at a smaller angle than longer wavelength light. In this manner, red light, green light, and blue light may be separated. As in the previous embodiment, an array of microlenses 50 along with a diffraction grating 52 focuses the separated light onto an array of liquid crystal cells 56. As the focal point of each color band can be determined, a cell corresponding to a particular color may be placed appropriately to receive that color. This embodiment is called off-axis microlenses as it looks and behaves similarly to decentered diffractive lenses known as off-axis lenses. The difference, however, is that the off-axis lens of the diffractive version shifts the focal points of the separated light longitudinally, whereas an off-axis lens of the refractive version shifts focal points laterally. This distinction results because focal lengths vary with wavelengths in a diffractive lens but not in a refractive lens. The only light separating component in a refractive off-axis lens is a grating which disperses light.

In this embodiment, the refractive lenses and the grating may be fabricated on the same substrate, may be combined into a single device or may be separate devices positioned near each other.

A single device combining a refractive lens with a blazed grating has been fabricated to separate infrared light into 8 µm, 10 µm and 12 µm bands as presented in *Optics Letters* Vol 18, No 15. Silicon off-axis microlenses with F/2 microlenses, focal length of f=200 µm and a pixel size of 100 µm×100 µm may be fabricated for infrared light to be separated into 3 color bands. The lens is corrected for spherical aberration and has a thickness profile given by $$t_L(x,y) = t_{L0} + \frac{(b + \sqrt{b^2 - 4ac})}{(2a)}, \quad (7)$$

where $t_{L0}$=5.2 µm is the maximum thickness of the lens, $a=n^2-1$, $b=2nf-2n^2f$, $c=n^2(x^2+y^2)$ and n=3.42. In order to separate the "red" light and the "blue" light focal points laterally by 50 µm, a grating of period 16.7 µm (6 grating periods per pixel) is used. The grating is blazed for the "green" light, so the thickness profile of this linear grating is $$t(x,y) = t_{G0}(x \bmod T)/T, \quad (9)$$

where $t_{G0}$ 1 is 4.1 µm, the grating period is T=16.7 µm, and mod ( ) refers to the modulo operator. The profile of the off-axis microlenses is obtained from simply combining the thickness profiles of the refractive lenses and the linear grating.

To obtain the refractive lens/diffractive grating combination, the thickness profile is converted into a set of four photolithographic masks. A silicon substrate is coated with a positive photoresist, patterned by contact photolithography and etched in a commercial parallel plate reactive-ion etching system for the first lithographic step. For the later steps, a multi-layer resist is required due to existing deep topography. First, a thick layer of high-viscosity AZ P4000 series photoresist is used to planarize the existing topography. Second, a layer of $SiO_x$ film is deposited by electron-beam evaporation to function as the intermediate transfer layer. Finally, a layer of positive photoresist is used as the imaging layer. The $SiO_x$ film is patterned by RIE in a $CHF_3$ plasma, and this pattern is duplicated into the planarization layer by $O_2$ RIE. The subsequent Si etching process is unchanged.

The target etch depths for this device are 0.52, 1.03, 2.07, and 4.13, resulting in a cumulative etch depth of 8 µm.

Although this embodiment has been described for silicon and the infrared region, a similar device may be fabricated to separate visible light. As a typical example, silica off-axis lenses might consist of F/2 microlenses with a focal length of f=40 µm and a pixel size of 20 µm×20 µm in combination with a grating of period T=1 µm.

Figure 6:
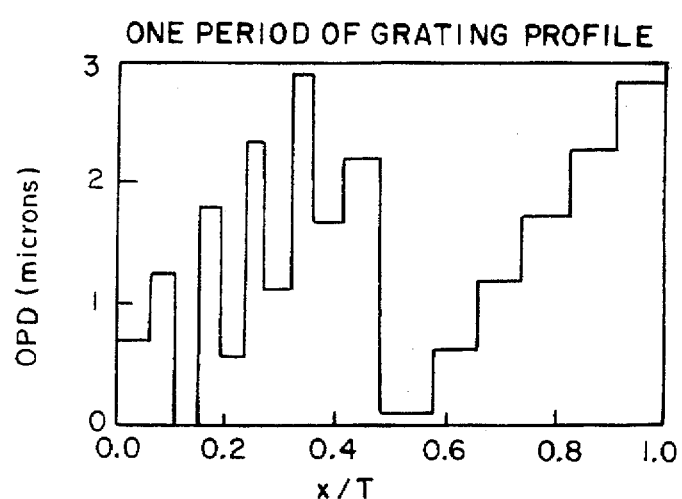
FIG. 6 is a graphical representation of the thickness profile of a linear diffraction grating for use in the present invention showing optical path difference (OPD) as a function of a normalized x-coordinate (x divided by the period T).
Figure 7:
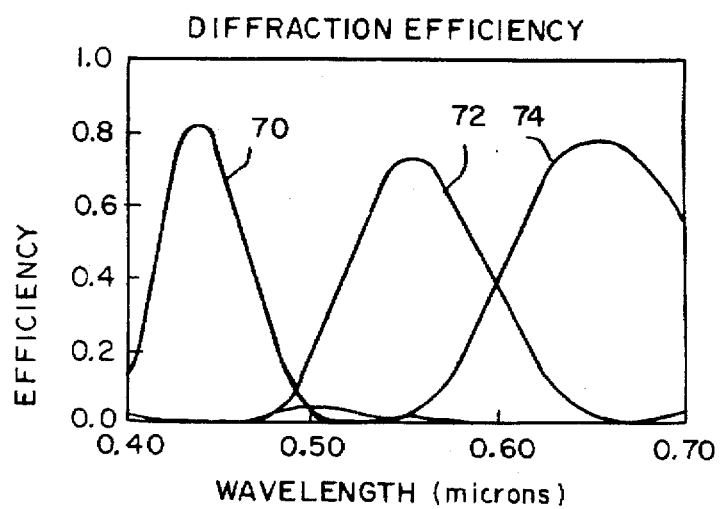
FIG. 7 is a graph of the diffraction efficiency curves for the grating profile of FIG. 6.

FIG. 6 illustrates a grating thickness profile which is neither an echelle grating as illustrated in FIG. 3, nor a blazed grating shown in FIG. 1. As shown in FIG. 7, the grating of FIG. 6 diffracts light into a −3 order 70, a 0 order 72 and the +2 order 74. In particular, red light is diffracted primarily into the +2 order 74, green light into the 0 order 72 and blue light into the −3 order 70. The grating of FIG. 6 has some advantages over the echelle grating illustrated in FIG. 3. In an echelle grating, the red and blue colors are diffracted into complementary orders (+1 and −1), but they are not diffracted into complementary angles (the red light will be diffracted upwards by an angle greater than that with which the blue is diffracted). In the grating of FIG. 6, the red and blue light are diffracted into complementary angles (equal upwards and downwards angular diffraction) although they are not in complementary orders (+2 and −3).

Figure 8:
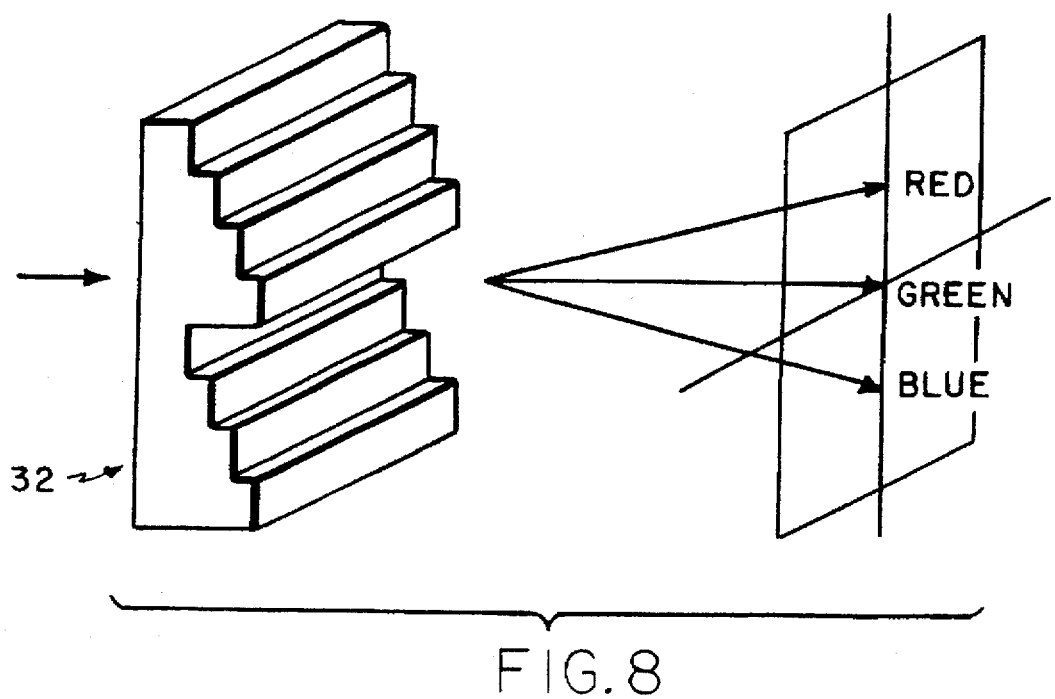
FIG. 8 is a schematic illustration of an echelle grating effecting a one-dimensional color separation.

As shown in FIG. 8, the echelle grating 32 (also shown in FIG. 3) diffracts light in a one-dimensional fashion as illustrated in the right hand portion of FIG. 8. By contrast, a diffraction grating 90 (FIG. 9) diffracts light in a two-dimensional fashion. That is, as shown in the right hand portion of FIG. 9, blue and green light are diffracted in a single plane while the red light is diffracted out of the plane. The advantage of the design in FIG. 9 is that some color displays have red, green and blue pixels which are not linearly arranged but which are arranged in a two-dimensional pattern.

Figure 9:
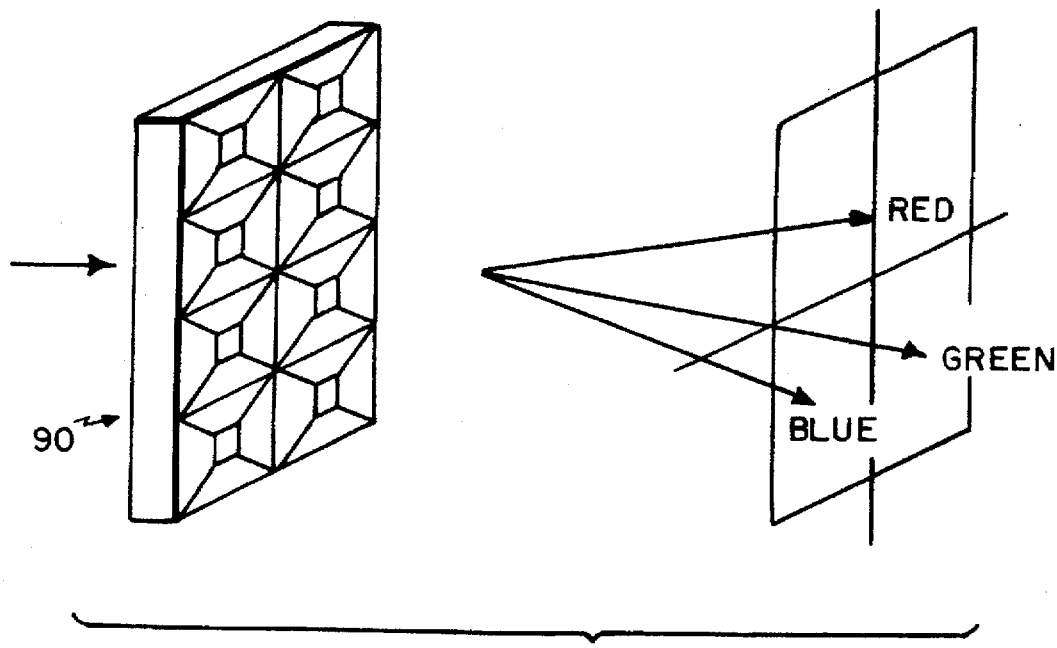
FIG. 9 is a schematic illustration of a diffraction grating for effecting a two-dimensional color separation.
Figure 10:
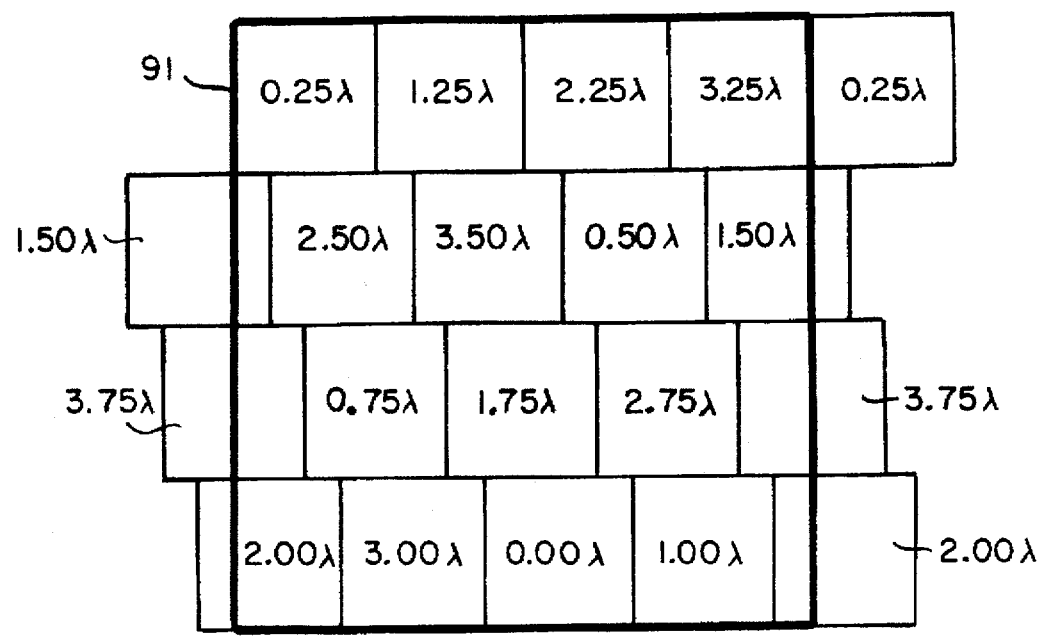
FIG. 10 is a schematic illustration of a grating design for two-dimensional color separation.
Figure 11:
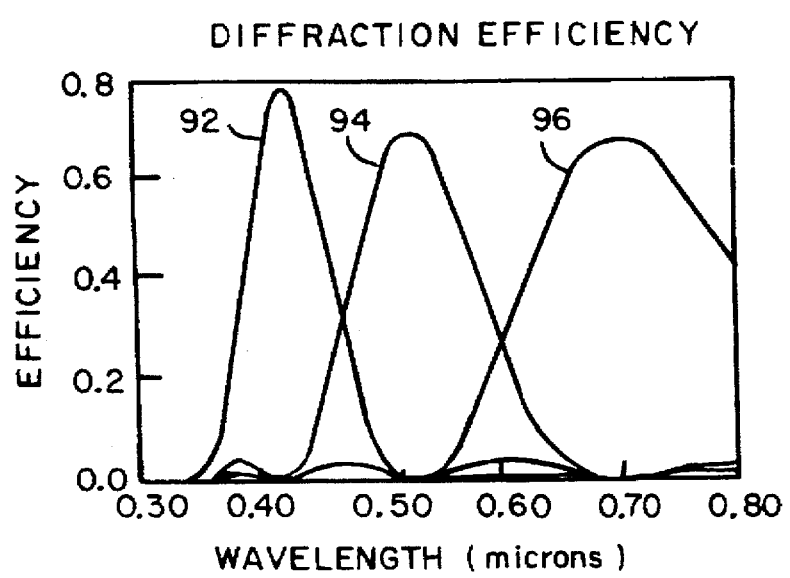
FIG. 11 is a graph of diffraction efficiency curves for the grating profile of FIG. 10.

FIG. 10 illustrates a grating thickness profile which diffracts light in a two dimensional manner as depicted in FIG. 9. The bold rectangle 91 in FIG. 10 shows the basic grating period. The grating is divided into rectangular areas which are of constant height and the height of each area is given by the number shown (e.g., 0.25 λ means that area should be of a height to introduce an optical path difference of 0.25 waves at the design wavelength usually in the green part of the spectrum). Note that although this design is shown to be composed of rectangular areas of constant height, neither the rectangularly shaped areas nor the constant height of each area is a requirement for this embodiment. FIG. 11 is a graph of the defraction efficiency curves for the grating profile of FIG. 10. The diffraction orders now have two indices since the design is two-dimensional in nature. In particular, as shown in FIG. 11, the grating of FIG. 10 diffracts blue light into the (1,1) order 92, green light into the (0,−1) order 94, and red light into the (−1,1) order 96.

It is recognized that modifications and variations of the present invention may occur to those skilled in the art, and it is intended that all such modifications and variations be included within the scope of the appended claims.

What is claimed is:

1. Optical apparatus for dispersing a visible light spectrum into primary color bands and directing each color band into a specified pixelated cell of a passive display comprising:

a display including pixelated cells;

an array of refractive microlenses arranged parallel to the plane of the display to receive visible light;

a diffraction grating arranged parallel, and in close proximity, to the array of refractive microlenses to separate the visible light into primary color bands, wherein said microlenses focus the visible light onto the display, while said diffraction grating separates the visible light into the primary color bands in different diffraction orders such that each color band is directed to the specified pixelated cell for transmission therethrough, wherein said diffraction grating comprises an optical material having a periodic echelle structure, wherein each period has a profile of discrete optical thicknesses and each profile begins with an minimum optical thickness, and increases stepwise in optical thickness to a maximum optical thickness, wherein said profiles are arranged such that the optical thickness of the profiles increases in the same direction across a surface of the optical material, with the maximum optical thickness of at least one profile abutting the minimum optical thickness of an adjacent profile, and wherein the physical difference in depth between adjacent steps within said profile is $$d = \frac{\lambda}{(n-1)}$$

where $\lambda$ is the design wavelength and n is the index of refraction of the material.

2. Optical apparatus for dispersing a visible light spectrum into primary color bands and directing each color band into a specified pixelated cell of a passive display comprising:

a display including pixelated cells;

an array of refractive microlenses arranged parallel to the plane of the display to receive visible light;

a diffraction grating arranged parallel, and in close proximity to, the array of refractive microlenses to separate the visible light into primary color bands, wherein said microlenses focus the visible light onto the display, while said diffraction grating separates the visible light into the primary color bands in different diffraction orders such that each color band is directed to the specified pixelated cell for transmission therethrough, wherein said diffraction grating comprises an optical material having a periodic echelle structure, wherein each period has a profile of discrete optical thicknesses and each profile begins with an minimum optical thickness, and increases stepwise in optical thickness to a maximum optical thickness, wherein said profiles are arranged such that the optical thickness of the profiles increases in the same direction across a surface of the optical material, with the maximum optical thickness of at least one profile abutting the minimum optical thickness of an adjacent profile, and wherein the physical difference in depth between adjacent steps is 1.14 μm.

3. Optical apparatus for dispersing a visible light spectrum into primary color bands and directing each color band into a specified pixelated cell of a passive display comprising:

a display including pixelated cells;

an array of refractive microlenses arranged parallel to the plane of the display to receive visible light;

a diffraction grating arranged parallel, and in close proximity, to the array of refractive microlenses to separate the visible light into primary color bands; and said diffraction grating adapted to separate the visible light two-dimensionally, wherein said microlenses focus the visible light onto the display, while said diffraction grating separates the visible light into the primary color bands in different diffraction orders such that each color band is directed to the specified pixelated cell for transmission therethrough.

4. Optical apparatus for dispersing a visible light spectrum into primary color bands and directing each color band into a specified pixelated cell of a passive display comprising:

a display including pixelated cells;

an array of refractive microlenses arranged parallel to the plane of the display to receive visible light; and a diffraction grating arranged parallel and in close proximity to the array of refractive microlenses to separate the visible light into primary color bands, wherein said microlenses focus the visible light onto the display, while said diffraction grating separates the visible light into the primary color bands in different diffraction orders such that each color band is directed to the specified pixelated cell for transmission therethrough, and wherein the diffraction grating diffracts light into substantially complementary angles but not in complementary orders.

* * * * *